United States Patent [19]

Neuweiler et al.

[11] 4,343,256

[45] Aug. 10, 1982

[54] SEWING MACHINE

[75] Inventors: Armin Neuweiler; Otmar Stillhard, both of Steckborn, Switzerland

[73] Assignee: Fritz Gegauf AG Bernina-Naehmaschinenfabrik, Steckborn, Switzerland

[21] Appl. No.: 150,836

[22] Filed: May 19, 1980

[30] Foreign Application Priority Data

Aug. 24, 1979 [CH] Switzerland .................. 7717/79

[51] Int. Cl.³ ............................................. D05B 69/22
[52] U.S. Cl. .................................................... 112/275
[58] Field of Search ............... 112/274, 275, 277, 220, 112/271, 221

[56] References Cited

U.S. PATENT DOCUMENTS

| | | | |
|---|---|---|---|
| 2,376,648 | 5/1945 | Anderson | 112/274 |
| 3,395,661 | 8/1968 | Creter | 112/220 |
| 3,598,071 | 8/1971 | Luczak et al. | 112/275 |
| 4,228,749 | 10/1980 | Pugliese | 112/274 |

FOREIGN PATENT DOCUMENTS 2528110 1/1976 Fed. Rep. of Germany .
1244425 9/1971 United Kingdom .

*Primary Examiner*—Peter P. Nerbun
*Attorney, Agent, or Firm*—Wender, Murase & White

[57] ABSTRACT

A sewing machine having a torsion spring coupling between drive and machine shaft. An engageable catch pawl acts on a stop element connected to the drive, which stop element is connected to the drive side of the coupling spring of the drive. If the catch pawl is engaged with the machine in operation and the stop element is blocked, the coupling spring is released and hence the coupling disengaged. The motor may then run down while the motor shaft is stopped resiliently in a predetermined position via the coupling spring which simultaneously the coupling spring prevents excessive forces from occurring due to inertia and excess stressing. Hence this construction permits the motor to be stopped rapidly from full operation with simple means.

9 Claims, 3 Drawing Figures

SEWING MACHINE

BACKGROUND OF THE INVENTION

The present invention relates to a sewing machine, more especially a domestic sewing machine, having a control device for stopping the needle bar in a predetermined position, comprising a variable speed electric motor controllable by means of a control circuit via a pedal or the like element, a coupling connecting the machine operationally with the motor and an engageable catch device which comes into action in the stop position of the needle bar when the pedal is released in order to stop the machine. Sewing machines of this kind are known and serve to stop the needle in a predetermined position, preferably the upper end position, so that, without any further adjustment of the machine by means of the hand wheel, the article being sewn may be simultaneously displaced or removed and then a new article to be sewn is introduced.

In known sewing machines having control devices of this type, releasing the pedals at first reduces the speed and then the machine is stopped in a predetermined position (British Patent Specification No. 1 244 425). In this case the machine unavoidably continues for a few revolutions upon release of the pedal and consequently executes a few stitches before being finally stopped.

It is also known to allow the machine to run down fully after release of the pedal and to switch the motor on again briefly to cause the shaft and hence the needle bar or needle to assume a definite position (U.S. Pat. No. 3,598,071), and again, the aforesaid disadvantages occur.

On the other hand a direct shut down of the machine on release of the pedal would be desirable, but this solution encounters various difficulties, particularly due to inertial forces occurring upon sudden stopping and, at maximum speed of for example, 1200 rpms, causing corresponding stresses and wear.

It is an object of the present invention to provide a solution to this problem.

SUMMARY OF THE INVENTION

According to the present invention there is provided a sewing machine having a control device for stopping the needle bar in a predetermined position, comprising an electric motor, the speed of which is adapted to be controlled via a pedal or the like element by means of a control circuit, a coupling connecting the motor operationally with the machine, a catch device adapted to be engageable at stop position of the needle bar when the pedal is released to stop the machine, and a spring used as a coupling, the catch device acting on the drive side of the coupling spring and the spring being so arranged that it acts as damping member relative to the mass of the machine to be stopped rapidly.

This makes it possible to keep the forces occurring due to inertia within tenable limits whilst providing sufficiently accurate shutting down of the machine. At the same time this provides a simple design because the coupling spring required in any case is used as an absorbing spring. Moreover, the electronic control permits the coupling to be engaged again immediately after the shut down operation.

BRIEF DESCRIPTION OF THE DRAWINGS

The invention will now be described further, by way of example, with reference to the accompanying drawings, in which.

DETAILED DESCRIPTION

Figure 1:
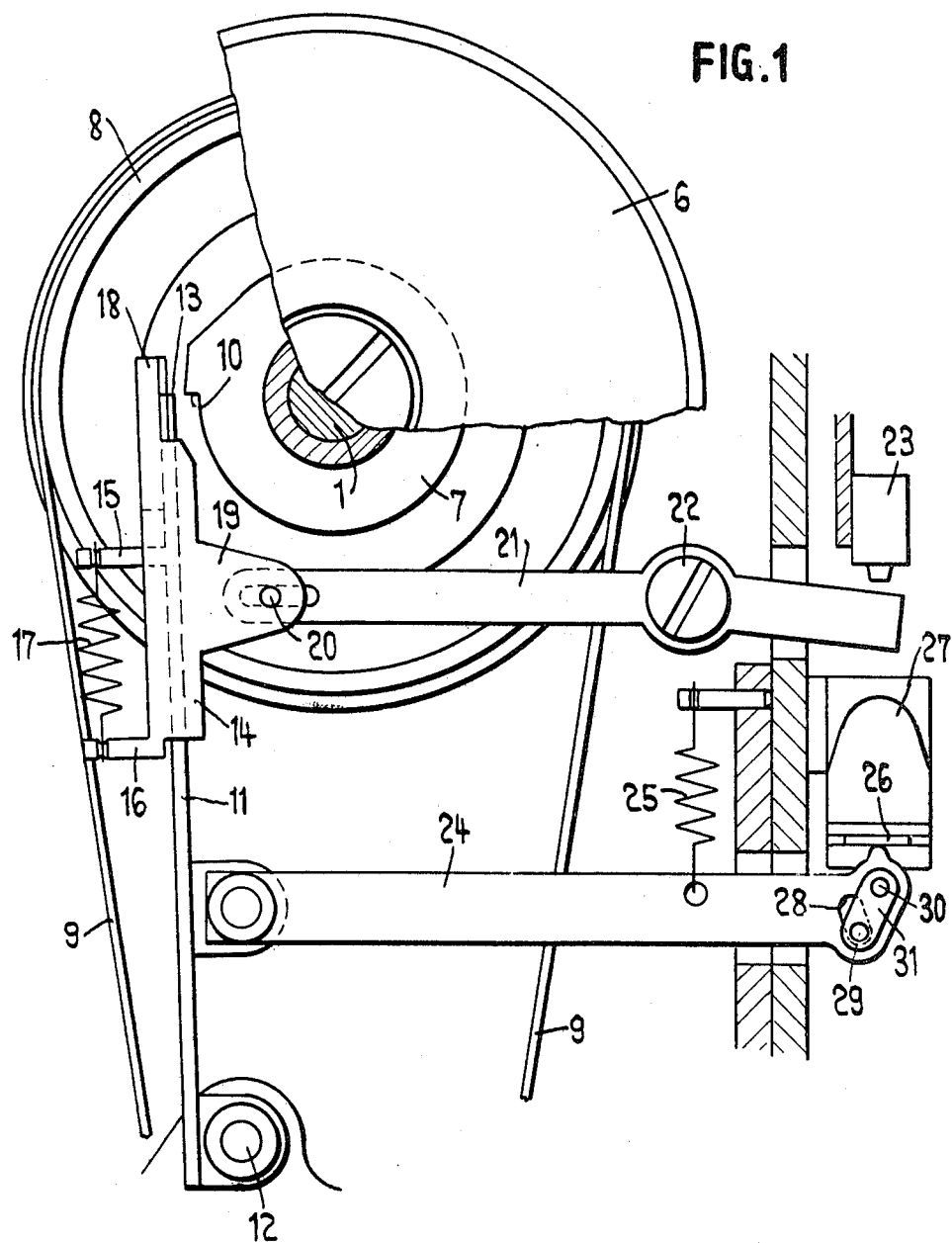
FIG. 1 is an elevational and partially diagrammatic view with parts broken away and parts in section of a preferred embodiment of a catch device in accordance with the present invention.
Figure 2:
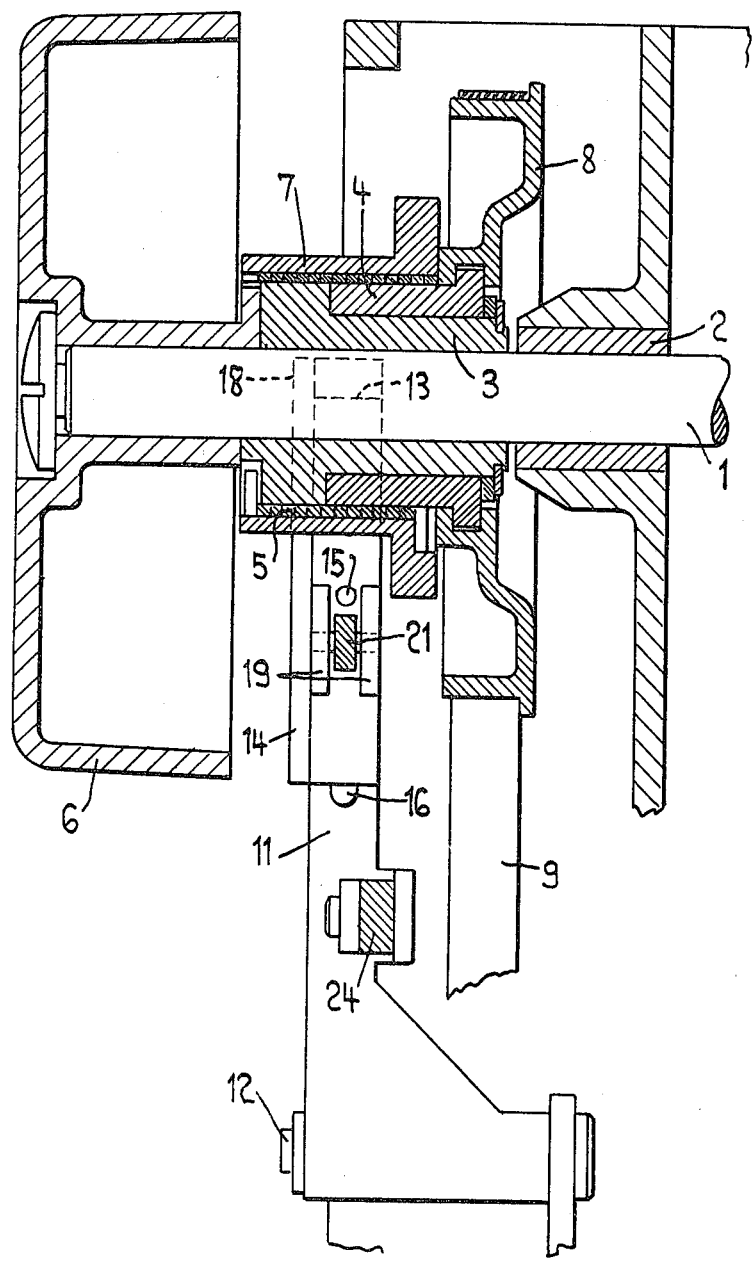
FIG. 2 is a sectional view through the coupling of the device of FIG. 1 and shows components of the catch device.

For the sake of clarity and brevity, only parts essential to the understanding of the present invention are shown in the drawings, with certain components depicted diagrammatically to provide an understanding of their function as well as structure. The upper shaft or arm shaft 1 is mounted in a forward shaft bearing 2 and securely connected to an inner coupling sleeve 3, and an outer coupling sleeve 4 is rotatably mounted on the inner coupling sleeve 3. Over the two coupling sleeves 3 and 4 there is located a coil spring 5, as a torsional coupling spring, one radially bent-in end of which engages the inner coupling sleeve 3. The coupling spring 5 by relative rotation of each of its ends; may be released or tensioned in a known manner to render the degree of coupling provided thereby operative or inoperative. The opposite radially outwardly-bent end of the coupling spring 5 engages in a stop sleeve 7 mounted rotatably on the coupling spring. The driving wheel 8, which may be driven by the motor shown in FIG. 3 via the belt 9 shown in FIG. 3, is connected to the outer coupling sleeve 4.

As shown in FIG. 1, the stop sleeve 7 at one point of its circumference has a radial stop surface 10. Outside this stop surface 10 there is a catch pawl 11 which is pivotal about an axle 12, and at its upper end has a catch surface 13. On the upper end of the catch pawl 11 a slider 14 is mounted. A pin 15 of the catch pawl 11 engages through an elongate hole of the slider 14, and a tension spring 17 acting between this pin 15 and an extension 16 of the slider 14 retains the slider 14 normally in the upper end position shown in which an upper stop surface 18 of the slider 14 is located over the catch surface 13 of the catch pawl 11. The slider 14 has a projection 19 which, via a laterally projecting pin 20, acts on a switch lever 21 which is pivotable about an axle 22 to operate a switch 23.

The catch pawl 11 is engaged by an actuating lever 24, the free end of which is constantly maintained in contact with a hinged armature 26 of an electromagnet 27. The lever 24 has an elongate hole 28 formed therein through which a fixedly mounted pin 29 engages. Between this pin 29 and a pin 30, connected to the lever 24, a strap 31 is mounted. Upon excitation of the magnet 27, the actuating lever is pivoted downwards and drawn to the right in FIG. 1 by the pin 29 sliding along the flank of the elongate hole 28. At the same time the strap 31 assumes a position in the longitudinal direction of the lever 24 and hence constitutes an effective locking preventing accidental longitudinal displacement of this lever under external forces.

Figure 3:
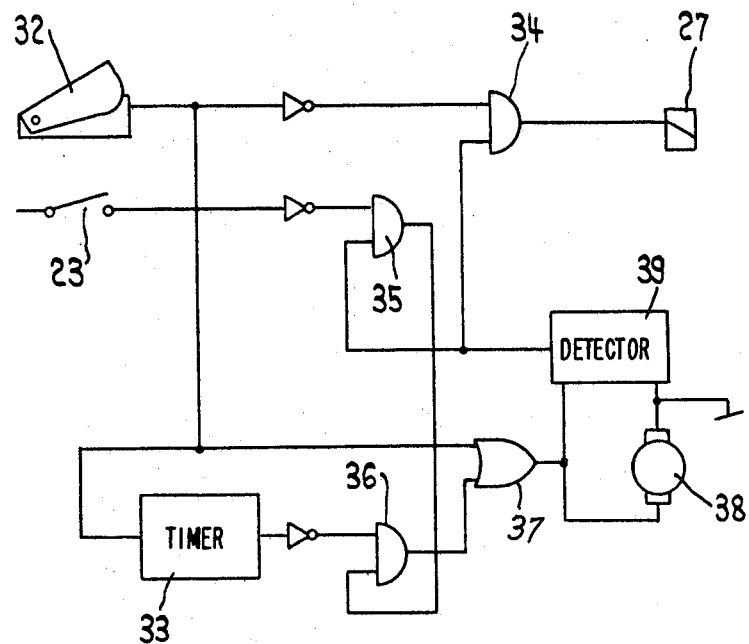
FIG. 3 is a block diagram of the control circuit of the device of FIG. 1.

FIG. 3 shows, schematically, the switch 23 which is open and in its inoperative state and the electromagnet 27. Furthermore, the pedal 32 of the sewing machine is shown which, in conventional manner, serves for the control of the motor or machine speed. The control system in this respect is not shown. From the pedal 32, a control lead passes to a timer 33 and, via an inverter, to an input of an AND gate 34, the output of which controls the electromagnet 27. The switch 23, via an inverter, controls an input of a further AND gate 35. The output of the gate 35 controls an input of a further AND gate 36 and thus an OR gate 37 which itself controls the driving motor 38 of the sewing machine. This motor 38 is provided with permanent field magnets, such that in the switched off state a voltage is supplied proportional to its speed. The motor circuit has a detector circuit 39 connected in parallel therewith which operates when the voltage at the motor 38 drops below a predetermined value and operates inputs of the AND gates 34 and 35. The control lead of the pedal 32 acts directly on one input of the OR gate 37. The output of the timer 33 acts via an inverter on an input of the gate 36.

The apparatus shown operates as follows: Normally the motor 38 is controlled in known manner by the pedal 32, whereby an operating voltage is connected to the motor 38. It is assumed that in operation, during normal running of the machine, the control information I is on the control lead of the pedal 32, and the logic signal rises from 0 to I during the closing of the pedal 32. Thus, if the pedal 32 is released to stop the machine, the information on the control lead of the pedal drops to 0. The electronic control circuit for the motor, not shown, however, remains effective for a low motor speed and the electromagnet 27 is hence energized via the gate 34. As described, this causes the lever 24 to be displaced towards the right-hand side in FIG. 1 and pivots the catch pawl 11 in a clockwise direction such that it arrives in the range of the stop surface of the stop sleeve 7. The stop surface 18 of the slider 14 thus moves into the range of the stop surface 10, and during rotation of the stop sleeve 7, in an anti-clockwise direction in FIG. 1, the stop surface 10 will first impact the stop surface 18 of the slider 14 and downwardly displace this slider 14, against the action of the spring 17 on the catch pawl 11. This displacement causes the switch lever 21 to be pivoted about axle 22 and closes the switch 23. Almost simultaneously, the stop surface 10 of the stop sleeve 7 also impacts the catch surface 13 of the catch pawl 11, whereby the stop sleeve 7 is stopped. However, inertia causes the motor and the machine to continue rotation, and the coupling spring 5 is thereby spread, causing the machine to be disengaged from the drive. At the same time, the coupling spring 5 causes a resilient slowing down of shaft 1 and hence the machine, and brings the machine rapidly to a standstill in a position corresponding to the stop position of the sleeve 7, which also accurately determines the position of the needle bar or needle. Hence, it is possible to stop the machine from full operation very rapidly in a desired position without excessive forces due to inertia having to occur. Even when the sewing machine is running very slowly a reliable and correct positioning occurs, in that the motor, on release of the pedal, continues to run at low speed.

Closing the switch 23 causes the information 0 to arrive via its associated inverter to the corresponding input of gate 35. The motor 38 is finally switched off via the gates 35, 36 and 37. As soon as the motor 38 during run down goes below a certain speed, the output of the detector 39 moves from I to 0 whereby the electromagnet 27 is de-energised. This causes the catch pawl 11 to return into its inoperative rest position and the machine may be rotated again, e.g. at the handwheel 6. The motor 38 should have stopped completely before the catch pawl 11 is disengaged. If on release of the pedal the machine does not stop, i.e. the switch 23 does not close, which is the case e.g. after reeling or with a jammed machine, the motor 38 after a certain time is also switched off by means of the timer 33, which, after the predetermined delay, switches off the motor circuit via the gates 36 and 37. By depressing the pedal 32 the magnet 27 may be de-energised at any time and with this the catch pawl 11 disengaged and the machine can start up normally.

As already stated, the stop sleeve 7 will normally have a stop surface 10 which causes the machine to be stopped so that the needle bar is retained in its upper end position. It is, however, also possible to provide several stop surfaces and/or catch pawls which may be rendered operative optionally in order to stop the machine in any predetermined position. Thus, e.g. the stop sleeve 7 may have several axially and peripherally offset stop surfaces and the catch pawl 11 by means of a suitable selection mechanism may be brought axially into the region of various stop surfaces. It is also possible to provide several optionally engageable position indicating units, the catch pawls of which, with reference to the stop sleeve, are located radially and peripherally offset to shut down the machine, accordingly, in any preselected stop position. In this case, it would be necessary for the various stop surfaces of the stop sleeve 7 to be located radially and peripherally offset on a flange, or, however, the various catch pawls could be offset along the circumference and be optionally activated so as to act on one and the same stop surface of the stop sleeve 7.

We claim:

1. A domestic sewing machine having a needle bar coupled to a drive shaft, comprising:
    an electric motor, the speed of which is controlled by means of a pedal via a control circuit;
    means for disengageably coupling said motor to the drive shaft of the machine, said coupling means including a spiral spring having one end driven by said motor and the other end fixed relative the drive shaft;
    a catch device connected to the driven end of said spiral spring and thus resiliently coupled to said drive shaft; and
    means for engaging said catch device upon release of said pedal causing said spiral spring to disengage said motor from the drive shaft and causing resilient braking of the drive shaft, thereby stopping the needle bar in a predetermined position.

2. A sewing machine according to claim 1, wherein said engaging means is controllable so that the needle bar may be stopped in any one of several predetermined positions.

3. A sewing machine according to claim 1 or 2, further including means activated by said engaging means upon termination of the stopping operation for switching off said motor, and automatic cut-out means connected to said engaging means for releasing said catch device as soon as said motor is almost at a standstill, thereby causing said spiral spring of said coupling means to reengage said motor with the drive shaft.

4. A sewing machine according to claim 3, wherein said automatic cut-out means is responsive to the speed of said motor for releasing said catch device at a predetermined motor speed, said predetermined motor speed being selected such that said motor comes to a standstill before said coupling means is reengaged.

5. A sewing machine according to claim 3, wherein said automatic cut-out means includes a timer which switches off said motor upon release of said pedal.

6. A sewing machine according to claim 1, wherein said coupling means includes an inner coupling sleeve secured to the drive shaft and an outer coupling sleeve rotatably mounted on said inner coupling sleeve and connected to said motor via a driving wheel, said spiral spring being located over said inner and said outer coupling sleeves with said fixed end of said spiral spring engaging said inner coupling and said driven end of said spiral spring engaging said catch device which is a stop sleeve mounted rotatably on said spiral spring, said stop sleeve impacting said engaging means when the needle bar is to be stopped to prevent rotation of said stop sleeve while further rotation of said inner coupling sleeve with the drive shaft exerts an opposite moment on said fixed end of said spiral spring, thereby spreading said spiral spring and disengaging the drive shaft from said motor.

7. A sewing machine according to claim 6, wherein said stop sleeve has a stop surface and said engaging means includes a catch pawl axially displaceable with respect to said stop surface so as to engage said stop surface, thereby causing the needle bar of the machine to stop in the predetermined position.

8. A sewing machine according to claim 7, wherein said engaging means includes an electromagnet for causing axial displacement of said catch pawl and means for locking said catch pawl in its axially displaced position so as to prevent reengagement of said coupling means before said motor has stopped, said catch pawl having an axially resilient portion recoiling upon impact of said catch pawl with said stop surface and actuating a switch which turns off said motor.

9. A sewing machine according to claim 6, wherein said stop sleeve has a stop surface and said engaging means includes a plurality of catch pawls, each of said catch pawls being radially offset with respect to said stop sleeve and being axially displaceable individually with respect to said stop surface so as to stop the needle bar of the machine in any one of several predetermined positions.

* * * * *